United States Patent
Blumenthal et al.

(10) Patent No.: US 7,284,237 B2
(45) Date of Patent: Oct. 16, 2007

(54) TESTING FLOW CONTROL AT TEST ASSERTION LEVEL

(75) Inventors: Andreas Blumenthal, Heidelberg (DE); Klaus Ziegler, Neidenstien (DE); Juergen Staader, Nussloch (DE); Andreas Simon Schmitt, Kaiserslautern (DE)

(73) Assignee: SAP Aktiengesellschaft, Walldorf (DE)

( * ) Notice: Subject to any disclaimer, the term of this patent is extended or adjusted under 35 U.S.C. 154(b) by 743 days.

(21) Appl. No.: 10/723,769

(22) Filed: Nov. 26, 2003

(65) Prior Publication Data

US 2005/0114839 A1    May 26, 2005

(51) Int. Cl.
   *G06F 9/44* (2006.01)
(52) U.S. Cl. ..................................... 717/124
(58) Field of Classification Search ................ 717/141, 717/144, 157
   See application file for complete search history.

(56) References Cited

U.S. PATENT DOCUMENTS

| | | | | |
|---|---|---|---|---|
| 5,774,725 A * | 6/1998 | Yadav et al. | ................. | 717/135 |
| 5,958,050 A * | 9/1999 | Griffin et al. | ................... | 726/1 |
| 6,044,466 A * | 3/2000 | Anand et al. | ................... | 726/1 |
| 6,698,012 B1 * | 2/2004 | Kossatchev et al. | ........ | 717/126 |
| 6,865,730 B1 * | 3/2005 | Burke et al. | ................. | 717/116 |
| 6,928,393 B2 * | 8/2005 | Czerwonka | .................. | 702/186 |
| 6,948,152 B2 * | 9/2005 | Dubovsky | ................... | 717/124 |
| 6,973,643 B2 * | 12/2005 | Goldsmith et al. | ......... | 717/124 |
| 7,032,212 B2 * | 4/2006 | Amir et al. | ................. | 717/124 |
| 7,079,648 B2 * | 7/2006 | Griffin et al. | .................. | 380/2 |
| 2003/0101442 A1 * | 5/2003 | Wu | ........................... | 717/156 |
| 2004/0133880 A1 * | 7/2004 | Paternostro et al. | ........ | 717/124 |

OTHER PUBLICATIONS

Hong, Hyoung Seok; Cha, Sung Deok; Lee, Insup; Sokolsky, Oleg; Ural, Hasan; "Data Flow Testing as Model Checking". p. 232-242, 203 IEEE, retrieved Feb. 5, 2007.*
Hsia, Pei; Li, Xiaolin; Kung, David C; "Augmenting Data Flow Criteria for Class Testing", p. 19, ACM 1997, retrieved Feb. 5, 2007.*
Vouk, M.A.; "Using Reliability Models During Testing With Non-Operational Profiles", 192, scholar.google.com, retrieved Feb. 5, 2007.*

* cited by examiner

*Primary Examiner*—Mary Steelman
(74) *Attorney, Agent, or Firm*—Fish & Richardson P.C.

(57) ABSTRACT

Techniques for test flow control include providing a test hierarchy, the test hierarchy includes a collection of test methods, each test method calling test assertion methods for checking the correctness of production code, and each test assertion call defines the test execution flow within the test hierarchy in an event of a failure. The flow inside the test hierarchy is controlled according to a parameter of the test assertion method call, in response to the event.

21 Claims, 6 Drawing Sheets

FIG. 1

```
* 1. productive class :
* defination
class OPERATIONS definition.
    public section.
        class-methods:
            ADD importing A type I
                          B type I
                    returning VALUE (RESULT) type I.
endclass.

* implementation
class OPERATIONS implementation.
    method ADD.
        RESULT = A + B.
    endmethod.
endclass.

* 2. test class:
* definition
class TEST_OPERATIONS definition for testing.
    public section.
        methods TEST_ADD for testing.
endclass.

* implementation
class TEST_OPERATIONS implementation.

method TEST_ADD.

*   test data: variable needed to store the result from the productive method:
    data: ACTUAL_RESULT type I.

*   call the method under test:
    ACTUAL_RESULT = OPERATIONS=>ADD( A = 3  B = 5 ).

*   compare the result with the expected value:
    CL_AUNIT_ASSERT=>ASSERT_EQUALS(
        ACT = ACTUAL_RESULT
        EXP = 8
        MSG = 'this is the message which occurs if the test failed'
    ).

endmethod.
endclass.
```

56
         ⎯⎯⎯⎯⎯⎯⎯⎯⎯⎯⎯⎯⎯⎯⎯
ASSERT_EQUALS ( ACT = ACTUAL RESULT

EXP = EXPECTED_RESULT
         MSG = 'this test has failed'
         QUIT = QUIT_VALUE ).
         ⎯⎯⎯⎯⎯   ⎯⎯⎯⎯⎯⎯⎯⎯⎯⎯⎯
           57              58

Where QUIT_VALUE defines at which level the test flow should be interrupted:
  - NO: continue the current test method.
  - METHOD: interrupt the current test method.
  - CLASS: interrupt the test class execution.
  - PROGRAM: abandon all test class executions of the currently tested program frame.

TESTING FLOW CONTROL AT TEST ASSERTION LEVEL

TECHNICAL FIELD

This invention relates to data processing, and more particularly to test flow control.

BACKGROUND

Software development is increasingly becoming complex resulting in the possibility for errors requiring costly solutions to correct. Software testing plays an important role in helping to ensure high software quality and to minimize errors. There are different kinds of testing in a software development process. For example, there is functional testing, performance testing, load or stress testing, robustness testing and installation testing. Functional testing includes unit testing, integration (or interaction) testing and acceptance testing. Here the term "unit" refers to a technique of testing only individual units of the software system and not the complete software system as a whole.

SUMMARY

The present invention provides methods and apparatus, including computer program products, providing test flow control.

In an aspect, the invention features a method including providing a test hierarchy, the test hierarchy including a collection of test methods, each test method calling test assertion methods for checking correctness of production code, each test assertion call defining a test execution flow within the test hierarchy in an event of a failure and controlling the test execution flow inside the test hierarchy according to a parameter of the test assertion method call in the event of the failure.

One or more of the following features can also be included. The parameter causes instructions to continue or to abort at any level of the test hierarchy after the event. A test assertion method includes instructions for verifying an expected state of the production code. The test hierarchy can be implemented using an object oriented programming language including at least one of the ABAP® (Advanced Business Application Programming) programming language, JAVA® programming language, C++ programming language, or C#® programming language. The test hierarchy can be implemented using a procedural programming language including at least one of C programming language, FORTRAN programming language and Pascal programming language. The test hierarchy can be implemented in a unit test environment.

In another aspect, the invention features a computer system including a test hierarchy, the test hierarchy including a collection of test methods, each test method calling test assertion methods for checking the correctness of production code, each test assertion call defining the test execution flow within the test hierarchy in an event of a failure and a means for controlling a flow inside the test hierarchy according to a parameter of the test assertion method call in response to the event.

One or more of the following features can also be included. The test assertion can be called with a parameter causing the test execution to continue or to abort at any level of the test hierarchy after the event. A test assertion method can include instructions for verifying an expected state of the production code. The test hierarchy can be implemented using an object oriented programming language including at least one of the ABAP® (Advanced Business Application Programming) programming language, JAVA® programming language, C++ programming language or C#® programming language. The test hierarchy can be implemented using a procedural programming language including at least one of C programming language, FORTRAN programming language and Pascal programming language. The test hierarchy can be implemented in a unit test environment.

The disclosed techniques may realize one or more of following advantages. In some cases, it may be preferable to continue a test even if a test has detected a failure in production code. For example, if the test setup is resource and time consuming and if the failure does not affect consecutive tests, then it may be preferable to continue a test even in the event of failure detection. In other cases, however, a test may have detected a failure in production code making remaining tests no longer necessary. For example, the remaining the methods/functions associated with a test, or the complete test class or even higher levels of tests accumulations may produce irrelevant test information. The flow of the execution of test code in a test hierarchy is controllable during the execution of the test code. As a result, tests that detect a failure condition are avoided if the tests are not relevant or not compatible with a current configuration.

Other features, objects, and advantages of the invention will be apparent from the description and appendices, and from the claims.

DETAILED DESCRIPTION

Figure 1:
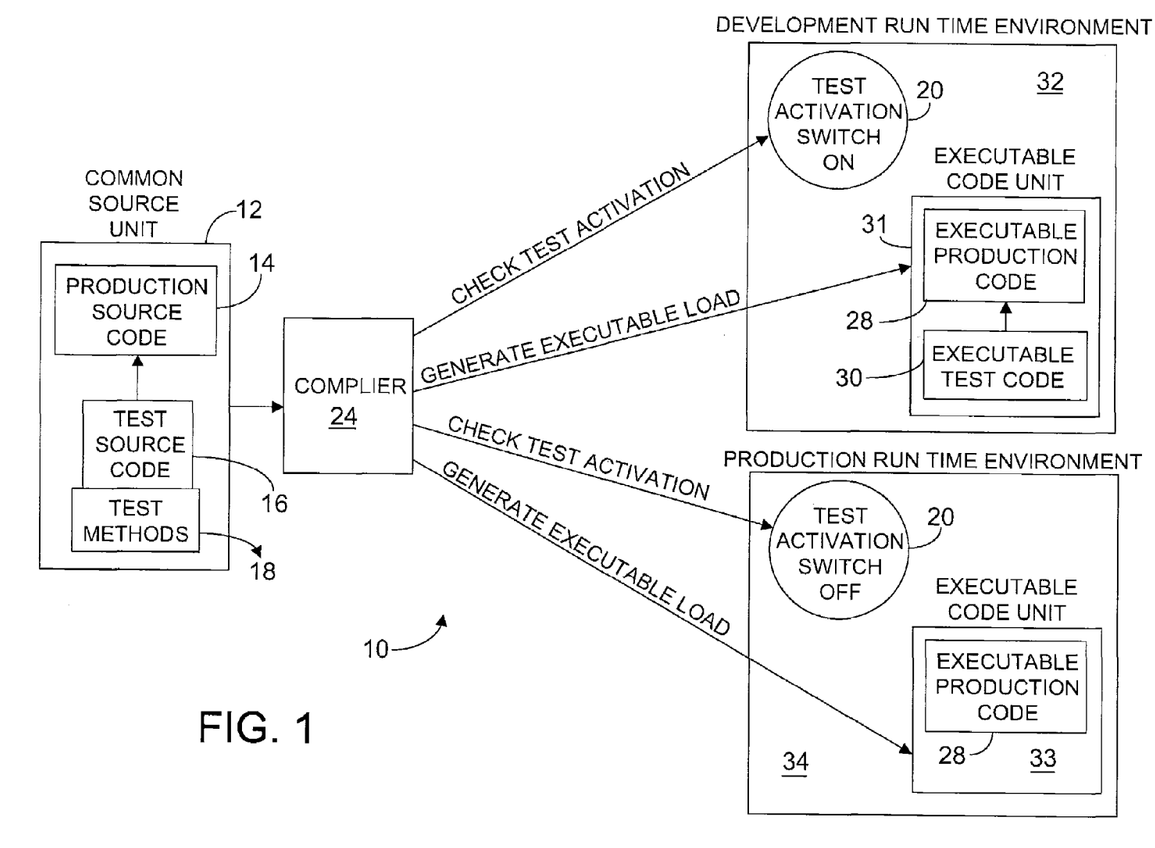
FIG. 1 is a block diagram of a programming environment.

FIG. 1 shows an exemplary programming environment 10. In the programming environment 10, executable production code 28 is generated from production source code 14. Executable test code 20 is generated from test source code 16.

In software development, a developer generates a common source unit 12 including production source code 14. The production source code 14 constitutes the actual software functionality (and is intended for a production environment 34 and a development environment 32). The common source unit 12 also includes test source code 16 intended for the development environment 32. The test source code 16 includes test methods 18 for testing the production source code 14. Test methods 18 are identified by a key word (test indicator), e.g., "for testing", that is an extension to a programming language, described below.

A compiler 24 converts production source code 14 and test source code 16 into executable code. During compilation, the compiler 24 checks a global switch 20 (test activation switch) to determine whether to generate an executable code unit 31 having both executable production code 28 and executable test code 30 or an executable code unit 33 with the executable production code 28 alone.

A syntax check during compilation can recognize static references from the production source code 14 to the test source code 16 and stop the compilation by producing a message indicating a syntax error. Upon receiving the syntax error, a developer can remove those static references. If the compilation proceeds with no syntax errors, the compilation generates executable code unit 31 in the development environment 32, including the executable test code 28 (if the global switch 20 is set to an "ON" state or activated). If the global switch 20 is set to an "OFF" state or deactivated (by default in the production run time environment 34), the compiler 24 generates executable code unit 33 without the executable test code 30.

To test the executable production code 28, the executable code unit 31 includes executable production code 28 and executable test code 30. The development runtime environment 32 recognizes global switch 20, executes the executable test code 30 and performs the tests directed by the executable test code 30. Because the executable test code 30 is embedded with the executable production code 28 in executable code unit 31, the executable test code 30 has unrestricted access to all functionality of the executable production code 28.

The production source code 14 must not include references to the test source code 16: if the final code is not thoroughly checked in order to prevent reference from test code 30 to production code 28 the following defect occurs. While in the development environment 32 the executable test code 30 is loaded, in the production system 34, the executable test code 30 is not loaded and attempts by the production code 28 to access test code 30 will fail because the test code 30 is not loaded in the production environment 34. This causes runtime errors in production systems where problems need to be detected.

In the production environment 34, only executable production code 28 is loaded. The tests performed by the executable test code 30 are not needed during normal production usage of a software system and only used for quality assurance. If the tests are not needed, system performance is improved without loading the executable production code 28 containing executable test code 30 as memory consumption is reduced.

As described above, the syntax check function of the compiler 24 detects static references from the production source code 14 to the test source code 16. Dynamic references are detected during execution of the executable production code 28 in the production environment 34 or in the development environment 32. If the run time system of development environment 32 or production environment 34 detects a dynamic reference, i.e., if executing production code 28 attempts to access parts, objects or functional code of the executable test code 30, then the run time system generates a runtime error aborting the running process and yielding an error message indicating the occurrence of such a dynamic reference.

An example production environment 34 includes a run time system such as a virtual machine (VM) as part of the JAVA environment from Sun Microsystems or .NET from Microsoft Corporation. Source code includes software instructions that can be written in a programming language such as a procedural programming language including C, Fortran and Pascal, an object oriented programming language such as advanced business application program language (ABAP) from SAP AG, JAVA programming language from Sun Microsystems, C++ programming language, C# programming language or other programming languages. The techniques of the programming environment 10 can be implemented for a xUnit test framework such as JUnit for JAVA programming language from Sun Microsystems and ABAP Unit for the ABAP programming language from SAP AG. For example, in a JAVA or .NET environment, the compiler 24 is a separate component of the run time system producing two separate byte code units, i.e., a byte code unit (or common intermediate language code unit) for production code and a byte code unit for test code (or common intermediate language code unit).

Figure 2:
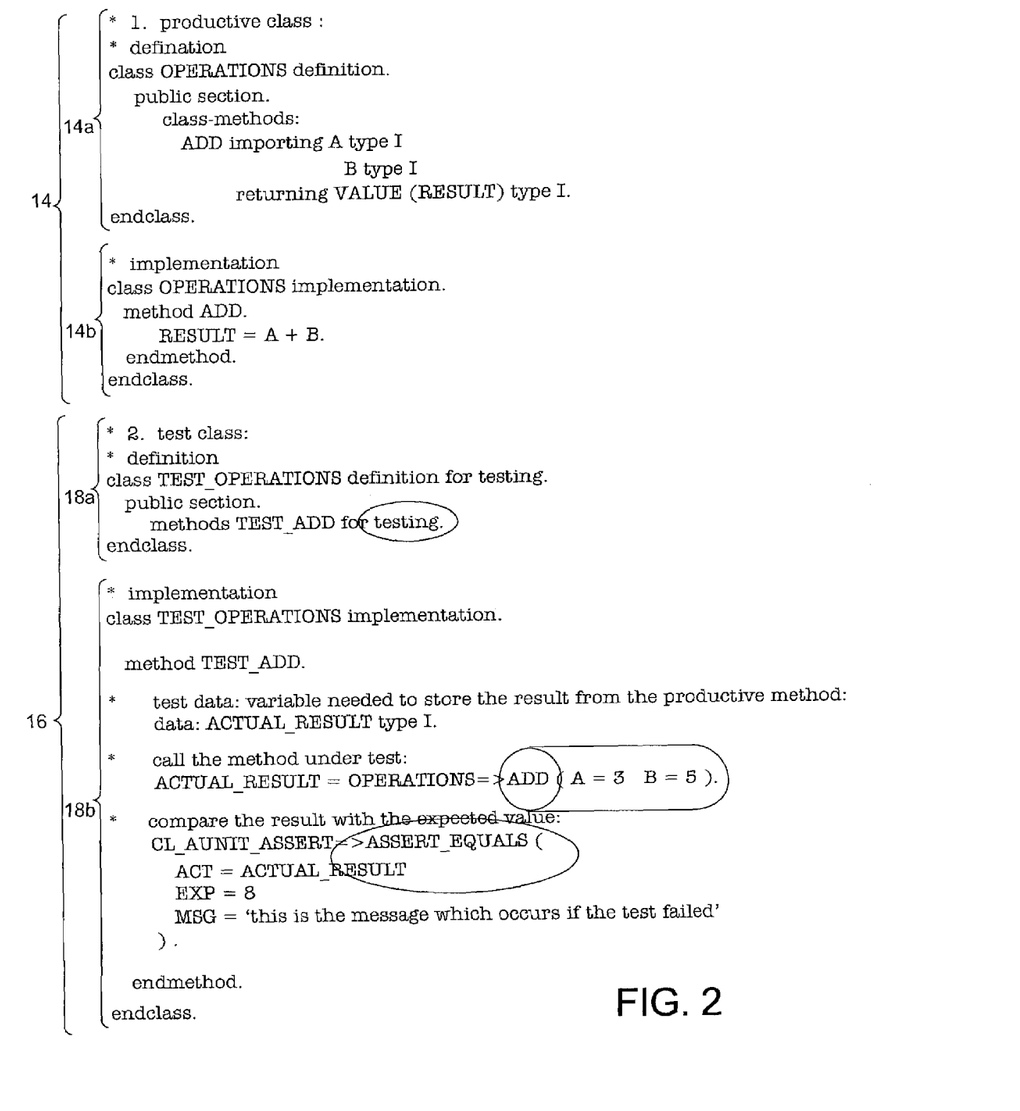
FIG. 2 is test source code and production source code.

FIG. 2 shows an example of production source code 14 and test source code 16. The production source code 14 includes software instructions for implementing an application, such as a business program for an enterprise, whereas test source code 16 includes software instructions for testing the production source code 14 in the development environment 32. The example, which is written in ABAP programming language, includes an asterisk (*) for introducing comments in plain text explaining the code and is disregarded by the compiler. The production source code 14 includes class definition 14*a* and class implementation 14*b*. The class definition 14*a* declares a production method ADD which is defined in the respective class implementation 14*b*. In this example, the method ADD adds two import parameters A and B and yields the result in an export parameter RESULT.

The test source code 16 implements a test class. This test class includes a test class definition 18*a* and a test class implementation 18*b*. The class is defined with the extension "for testing". The extension identifies the class as a test class so that the compiler 24 can distinguish it from the production source code 14. The test class definition 18*a* declares a test method TEST_ADD. The extension "for testing" identifies this method as a test method. The test methods can be called from test tools of a development environment when performing the tests.

The test class implementation 18*b* defines the test method TEST_ADD that is declared by the class definition. The test method TEST_ADD represents a method that tests the production method ADD of the production code 14. The test method TEST_ADD calls the production method ADD with parameter values, e.g. the parameter A set to a value of "3" and the variable B set to a value of "5." The result of the call to the production method ADD is assigned to the variable ACTUAL_RESULT for subsequent comparison. The test class implementation 18*b* then uses the test assertion method ASSERT_EQUALS for comparing the value represented by ACTUAL_RESULT and passes to the parameter act with the expected value passed to the parameter EXP. This test assertion method is one of a series of assertions provided by utility class CL_AUNIT_ASSERT that is part of the ABAP programming environment. This utility class is part of the unit test framework "ABAP Unit" (Other test assertions are verified by methods from CL_AUNIT_ASSERT such as ASSERT_INITIAL, ASSERT_BOUND or just FAIL unconditionally). If the value passed to ACT is not equal to the value passed to EXP, then the test assertion method ASSERT_EQUALS generates a message with the test specified by the parameter MSG indicating that the test failed or an error has been detected. If the value of ACT is equal to the value of EXP, then the test assertion method ASSERT_EQUALS returns without generating a message MSG indicating that the test was successful. Thus, the production method ADD, if operating properly, returns a result of "8" based on adding "3" and "5." If the production method ADD is not operating properly, the test assertion method ASSERT_EQUALS detects this failure condition and yields a warning message.

Figure 3:
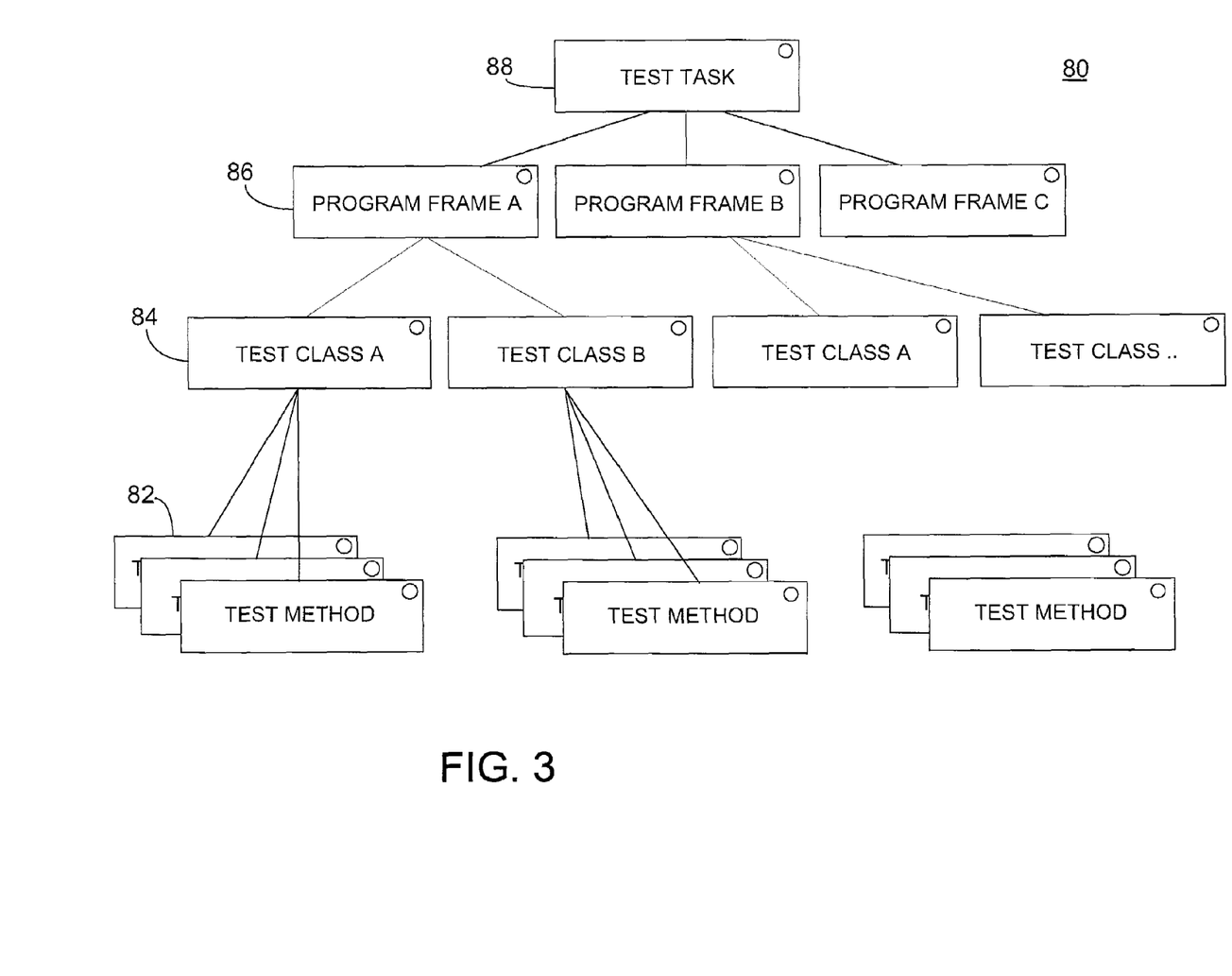
FIG. 3 is a diagram of a test hierarchy for testing production code.

FIG. 3 illustrates an exemplary test hierarchy 80 for testing a program. The test hierarchy 80 is implemented in an ABAP Unit test programming environment. At a lowest level, the test hierarchy 80 provides test methods 82 having test assertion (expressed by calling the respective test assertion methods) for testing production code. The test methods 82 are part of test classes 84 which are in turn are part of the program frames 86. The program frames 86 are further grouped into a test task 88. The test hierarchy 80 can be implemented using an object oriented programming language such as ABAP, JAVA, C++, C# and the other programming languages.

Figure 4:
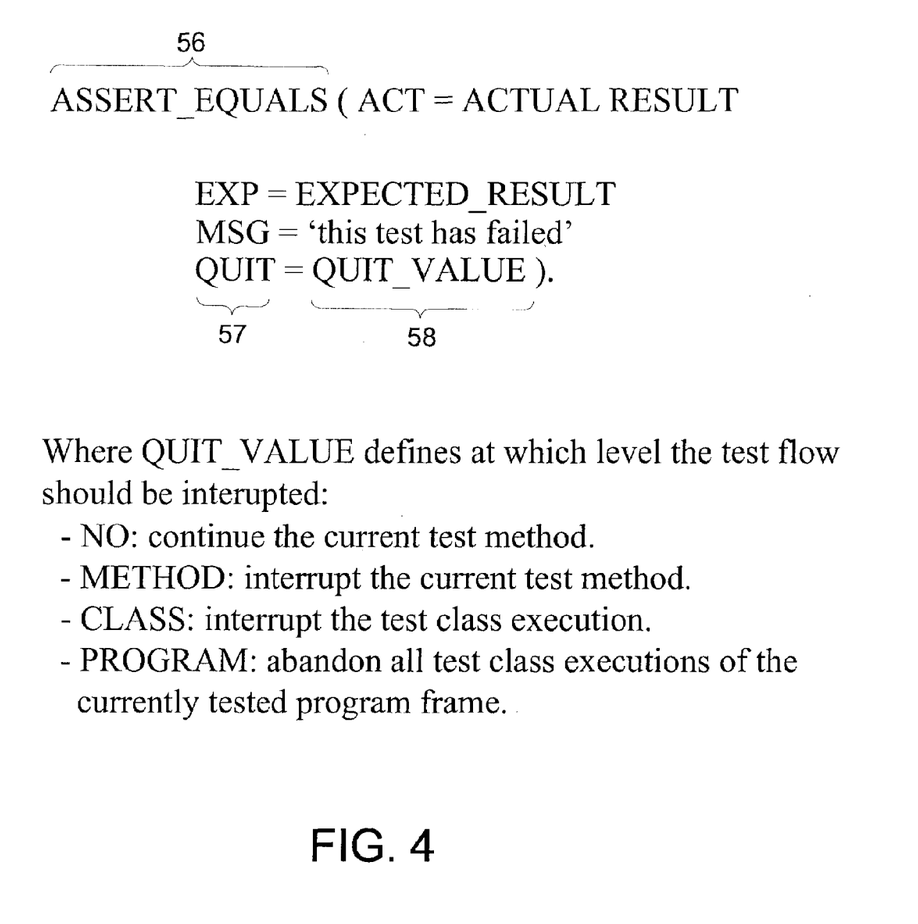
FIG. 4 is a test assertion method for testing a production code.

FIG. 4 is an exemplary call of a test assertion method ASSERT_EQUALS 56 provided by the ABAP Unit utility class CL_AUNIT_ASSERT. The method 56 can be used for verifying test assertions for the behavior of the production source code 14. A developer implements production source code 14 that, for example, performs particular operations on data and produces a result of the operations. The production source code 14 can include a method that performs an addition operation on two numbers and returns the result to a calling program. The developer may wish to test the addition operation over a range of numbers including extreme values such as zero and negative numbers. In this example, the test assertion method ASSERT_EQUALS 56 is used to compare an expected result EXP_RESULT from production code 14 with an actual result ACTUAL_RESULT returned from the production code being tested.

The test assertion method ASSERT_EQUALS 56 is similar to the test assertion method ASSERT_EQUALS in FIG. 2. However, in this example, an optional parameter 57 is supplied which otherwise is set to a default value. The optional parameter 57 provides the developer an ability to control the flow of a test execution and to decide at which level the test flow should be interrupted. The optional parameter 57 can be set to one of several constant, predefined values QUIT_VALUES 58 for controlling the flow of a test. For example, if the optional parameter 57 is set to the value of "NO" (parameter passing: QUIT=NO), then the current test method continues with the next statement inside the function regardless of whether the test assertion was triggered by an error. The default behavior (and the traditional behavior of xUnit implementations) causes an interruption of the current test method in case of a failure. This is also the case if the optional parameter 57 is set to a value of "METHOD." If the optional parameter 57 is set to a value of "CLASS," in the event of a detection of a failure, the current test class is interrupted. Likewise, if the optional parameter 57 is set to the value of "PROGRAM," then, in the event of failure detection, the execution of all test classes associated with this particular program is abandoned. As a result, test execution of a test hierarchy can be controlled when a failure condition is detected in production code.

Figure 5:
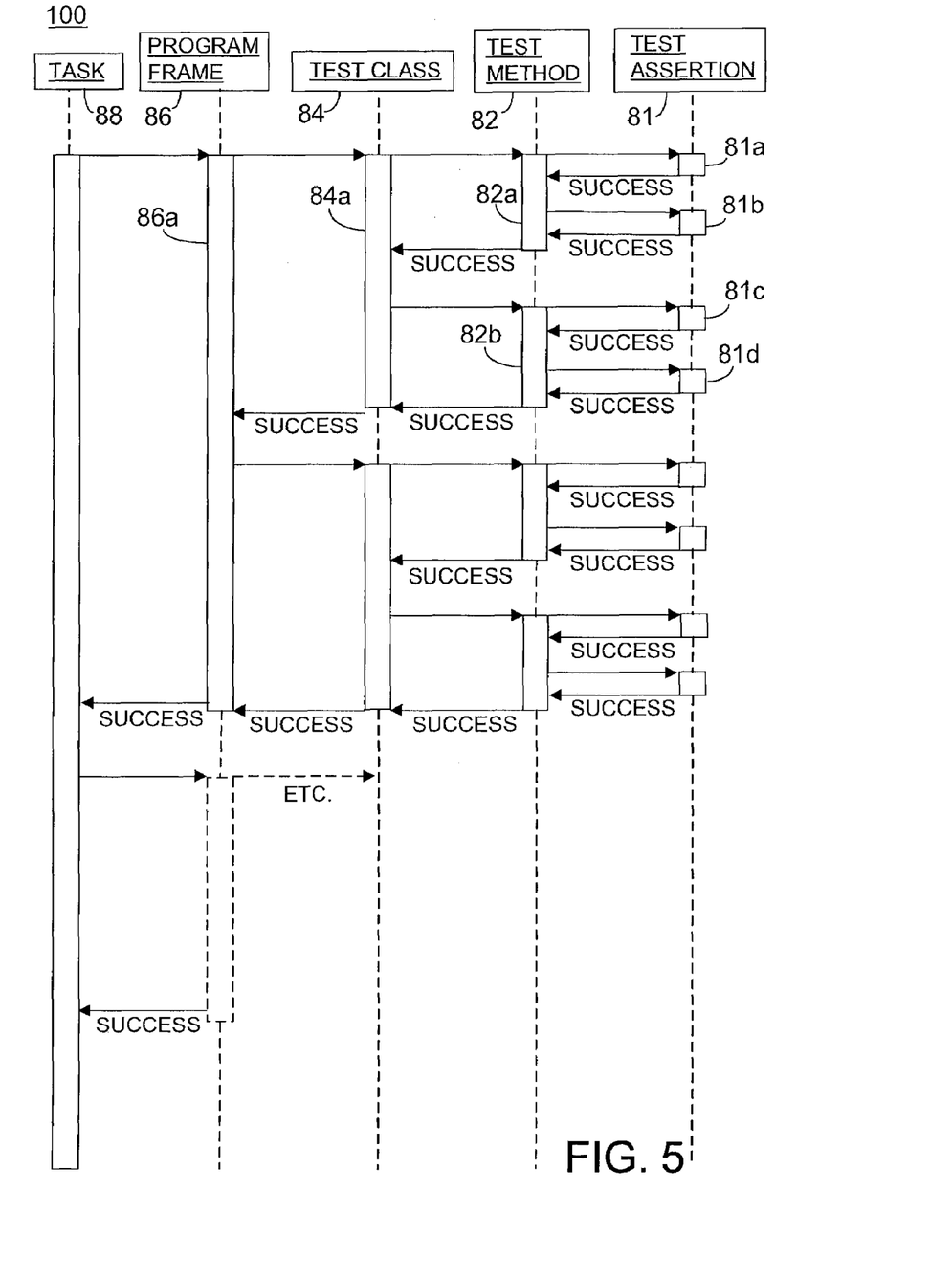
FIG. 5 is a diagram of a test sequence of a successful test completion.

FIG. 5 shows an exemplary test sequence diagram 100 of a successful test completion of a test hierarchy as applied to production source code 14. The test sequence diagram 100 illustrates a test sequence or test flow similar to the test hierarchy 80 of FIG. 3 as it is implemented in an ABAP Unit programming environment. It should be noted that only a portion of the test hierarchy is described to simplify the discussion. The test hierarchy is organized according to a test task 88 having a program frame 86a, which in turn, further includes a test class 84a having test methods 82a and 82b. The test method 82a includes test assertions 81a and 81b. In a similar manner, test method 82b includes test assertion method calls 81c and 81d. It should also be noted that other test hierarchy configurations are possible in other programming language environments. In operation, the test hierarchy is applied to production source code to test the functionality of the code.

FIG. 5 illustrates a result of each test assertion method 81 is successful indicating that the method has not detected any failures or errors in the production source code 14. For example, the result of the execution of test assertion method 81a is successful as indicated by the reference Success. FIG. 5 illustrates that the complete test hierarchy is traversed so that all the tests are completely executed.

Figure 6:
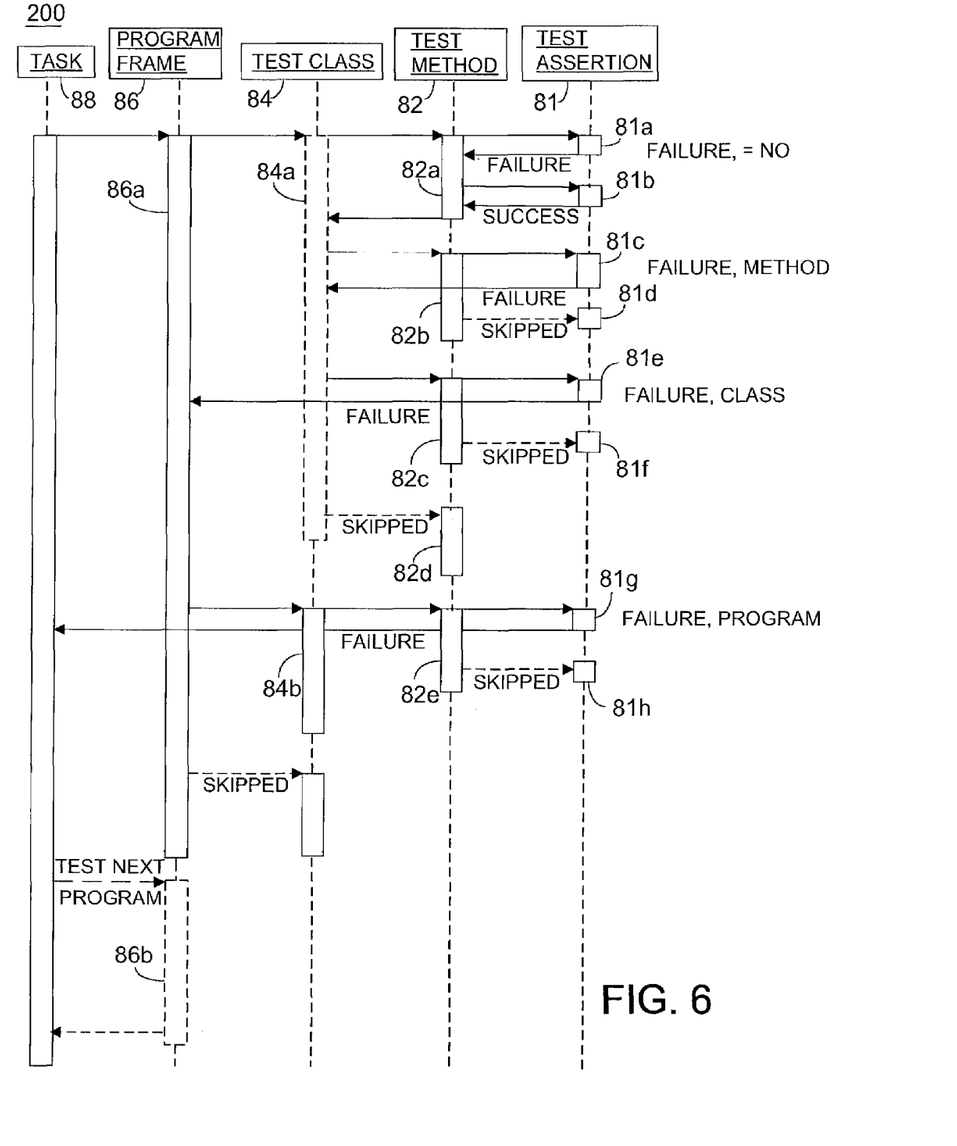
FIG. 6 is a diagram of a test sequence after detection of a failure.

FIG. 6 illustrates an exemplary test sequence diagram 200 of a test hierarchy after detection of failures in a production code. In this example, the test flow begins with the execution of test assertion method 81a. The test assertion methods called in this example can be the test assertion method ASSERT_EQUALS 56 of FIG. 4 specifying the optional parameter 57 to a value of "NO," "METHOD," "CLASS" and "PROGRAM" respectively. A failure detection condition in the production source code is indicated by the reference "Failure" and a non-failure condition is indicated by the reference "Success". A failure condition is defined when production code fails to produce an expected result. Test assertion 81a quit behavior is set to a value of "NO", specifying that if a failure is detected, the next test method should be executed, which in this case is test assertion method 81b. More specifically, the optional parameter is set to the value of NO. However, to simplify the description, setting the test assertion quit behavior to a value means setting this optional parameter to the respective value.

Since test assertion method 81b is successful, the test flow continues onto the next test assertion method, which is test assertion method 81c. Test assertion method 81c is associated with test method 82b under test class 84a. Test assertion method 81c is executed, and like test assertion method 81b, it also detects a failure condition. However, the test assertion 81c quit behavior is set to the value of "METHOD." As a result, test assertion method 81d is skipped and execution resumes at the next test method 82c with test assertion 81e being executed. The test assertion method 81e detects a failure condition. Since the value of this test assertion 81e quit behavior is set to a value of "CLASS," execution is forced to resume at the next test class 84b causing the remaining test assertion 81f as well as the next test method 82d to be skipped. Under test class 84b, test assertion method 81g is executed, which detects a failure. Since the value of test assertion 81g quit behavior is set to a value of "PROGRAM," testing is forced to resume at the next program frame 86b. As a consequence, any remaining test methods in program frame 86a are aborted. Thus, the above described flow control is achieved by specifying an optional parameter, in this case, the optional parameter.

The above is intended as an example and other configurations are possible such as providing more than one assertion method with different names instead of the optional parameter.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

Other embodiments are within the scope of the following claims.

What is claimed is:

1. A method comprising:
   providing a test hierarchy implemented in a common source unit including production source code and test source code, the test hierarchy including a collection of test methods, a test method in the collection of test methods including test source code specifying a call to a test assertion method for testing the production source code, the test assertion call defining a test execution flow within the test hierarchy in an event of a failure; and
   controlling the test execution flow inside the test hierarchy in the event of failure according to a parameter value of the call to the test assertion method, the parameter values available for controlling the test execution flow including values specifying:
      continuing the test execution flow with a next statement in the test method;
      interrupting the test execution flow of the test method and continuing the test execution flow with any remaining test methods in the test hierarchy; and
      interrupting the test execution flow of a test class containing the test method and continuing the test execution flow with any remaining test classes in the test hierarchy.

2. The method of claim 1 wherein the parameter causes instructions to continue or to abort at any level of the test hierarchy after the event.

3. The method of claim 1 wherein a test assertion method includes instructions for verifying an expected state of the production source code.

4. The method of claim 1 wherein the test hierarchy is implemented using an object oriented programming language.

5. The method of claim 1 wherein the test hierarchy is implemented using a procedural programming language including at least one of C programming language, Fortran programming language and Pascal programming language.

6. The method of claim 1 wherein the test hierarchy is implemented in a unit test environment.

7. The method of claim 1, wherein the parameter values available for controlling the test execution flow include a value specifying:
   interrupting the test execution flow of a program frame containing the test method and continuing the test execution flow with any remaining program frames in the test hierarchy.

8. A computer program product, tangibly embodied in a machine-readable storage device, the computer program product comprising instructions operable to:
   provide a test hierarchy implemented in a common source unit including production source code and test source code, the test hierarchy including a collection of test methods, a test method in the collection of test methods including test source code specifying a call to a test assertion method for testing the production source code, the test assertion call defining a test execution flow inside the test hierarchy in an event of failure detection; and
   control the test execution flow within the test hierarchy in the event of failure according to a parameter value of the call to the test assertion method, the parameter values available for controlling the test execution flow including values specifying:
      continuing the test execution flow with a next statement in the test method;
      interrupting the test execution flow of the test method and continuing the test execution flow with any remaining test methods in the test hierarchy; and
      interrupting the test execution flow of a test class containing the test method and continuing the test execution flow with any remaining test classes in the test hierarchy.

9. The product of claim 8 wherein the parameter causes the test execution flow to continue or to abort at any level of the test hierarchy after the occurrence of the event.

10. The product of claim 8 wherein a test assertion method includes instructions for verifying an expected state of the production source code.

11. The product of claim 8 wherein the test hierarchy is implemented using an object oriented programming language.

12. The product of claim 8 wherein the test hierarchy is implemented using a procedural programming language including at least one of C programming language, Fortran programming language and Pascal programming language.

13. The product of claim 8 wherein the test hierarchy is implemented in a unit test environment.

14. The product of claim 8, wherein the parameter values available for controlling the test execution flow include a value specifying:
   interrupting the test execution flow of a program frame containing the test method and continuing the test execution flow with any remaining program frames in the test hierarchy.

15. A computer system comprising:

a processor for executing program instructions; and one or more memory devices storing program instructions implementing a test hierarchy implemented in a common source unit including production source code and test code, the test hierarchy including a collection of test methods, a test method in the collection of test methods including test source code specifying a call to a test assertion method for testing the production source code, the test assertion call defining the test execution flow within the test hierarchy in an event of a failure, the one or more memory devices further storing program instructions operable to control a flow inside the test hierarchy in the event of failure according to a parameter value of the call to the test assertion method, the parameter values available for controlling the test execution flow including values specifying:

continuing the test execution flow with a next statement in the test method;

interrupting the test execution flow of the test method and continuing the test execution flow with any remaining test methods in the test hierarchy; and interrupting the test execution flow of a test class containing the test method and continuing the test execution flow with any remaining test classes in the test hierarchy.

16. The system of claim 15 wherein the parameter causes the test execution to continue or to abort at any level of the test hierarchy after the event.

17. The system of claim 15 wherein a test assertion method includes instructions for verifying an expected state of the production source code.

18. The system of claim 15 wherein the test hierarchy is implemented using an object oriented programming language.

19. The system of claim 15 wherein the test hierarchy is implemented using a procedural programming language including at least one of C programming language, Fortran programming language and Pascal programming language.

20. The system of claim 15 wherein the test hierarchy is implemented in a unit test environment.

21. The system of claim 15, wherein the parameter values available for controlling the test execution flow include a value specifying:

interrupting the test execution flow of a program frame containing the test method and continuing the test execution flow with any remaining program frames in the test hierarchy.

* * * * *